(12) United States Patent
Schmidt et al.

(10) Patent No.: US 6,209,323 B1
(45) Date of Patent: Apr. 3, 2001

(54) MOTOR VEHICLE ENGINE BRAKE CONTROL METHOD

(75) Inventors: Erwin Schmidt, Baltmannsweiler; Siegfried Sumser, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/288,224

(22) Filed: Apr. 8, 1999

(30) Foreign Application Priority Data

Apr. 8, 1998 (DE) ................................................ 198 15 711

(51) Int. Cl.[7] ...................................................... F02D 23/00
(52) U.S. Cl. ............................................... 60/602; 180/197
(58) Field of Search ................................. 60/602; 477/79, 477/3; 74/858, 866; 364/424.1; 180/197

(56) References Cited

U.S. PATENT DOCUMENTS

| | | | |
|---|---|---|---|
| 4,685,302 | * 8/1987 | Abo et al. | 60/602 |
| 4,702,080 | * 10/1987 | Ueno et al. | 60/602 |
| 4,905,544 | * 3/1990 | Ganoung | 74/858 |
| 5,088,348 | 2/1992 | Hiramuki. | |
| 5,146,752 | * 9/1992 | Bruestle | 60/602 |
| 5,157,608 | * 10/1992 | Sankpal et al. | 364/424 |
| 5,161,432 | * 11/1992 | Matsumoto et al. | 74/866 |
| 5,505,671 | 4/1996 | Streib et al. | 477/115 |
| 5,782,092 | * 7/1998 | Schultalbers et al. | 60/602 |
| 5,833,570 | * 11/1998 | Tabata et al. | 477/3 |
| 5,938,561 | * 8/1999 | Schubert | 477/79 |

FOREIGN PATENT DOCUMENTS

| | | |
|---|---|---|
| 0 640 750 | 3/1995 | (EP) . |
| 43 29 916 A1 | 3/1995 | (DE) . |

* cited by examiner

*Primary Examiner*—Thomas Denion
*Assistant Examiner*—Thai-Ba Trieu
(74) *Attorney, Agent, or Firm*—Evenson, McKeown, Edwards & Lenahan, P.L.L.C.

(57) ABSTRACT

A method automatically controls the engine brake of a motor vehicle in which, in the coasting operation during a transmission shifting operation, the resulting braking torque acting upon the internal-combustion engine is reduced. In order to be able to control as precisely and inexpensively as possible the torques acting upon the internal-combustion engine in the engine braking operation of the vehicle during a transmission shifting operation, the injected fuel quantity is increased during the shifting operation.

6 Claims, 1 Drawing Sheet

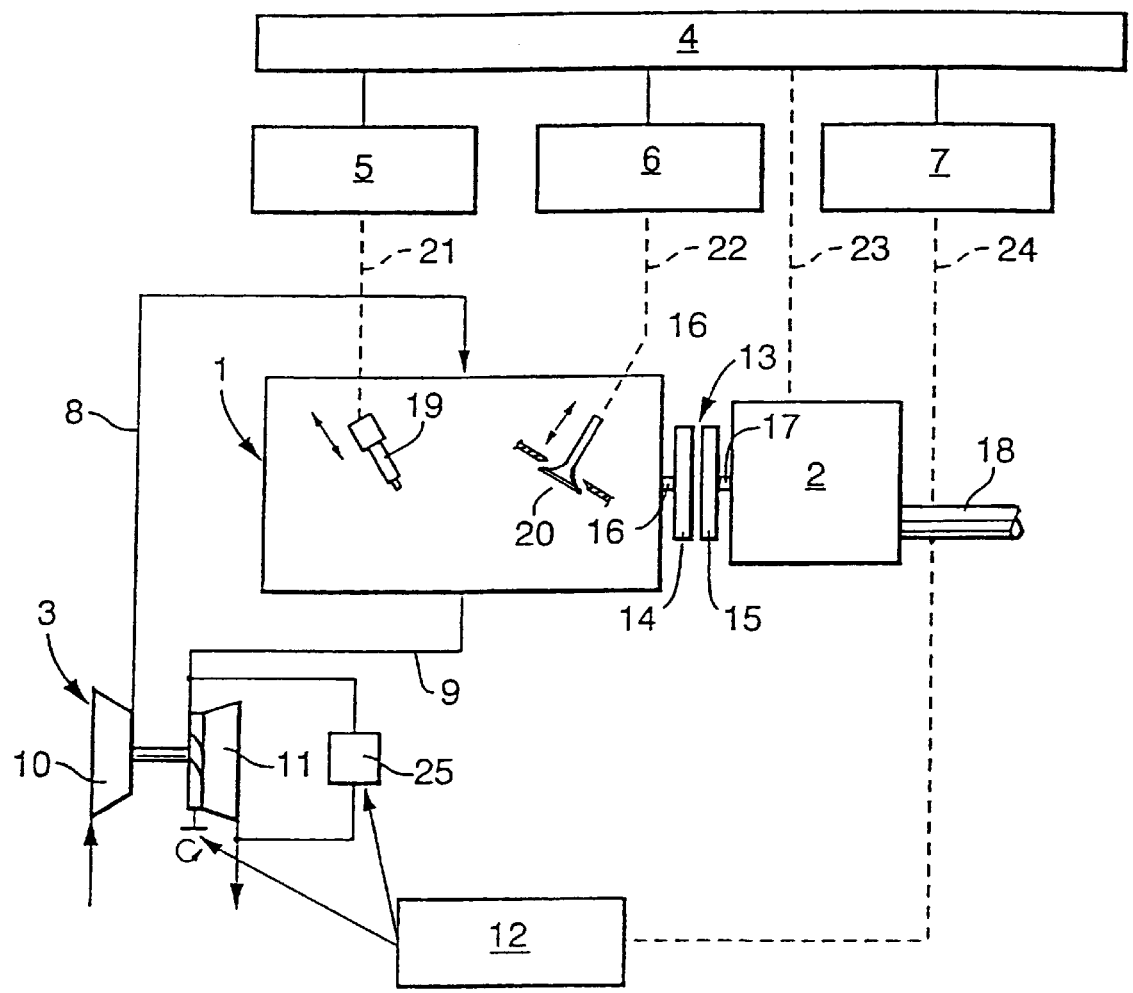

MOTOR VEHICLE ENGINE BRAKE CONTROL METHOD

BACKGROUND OF THE INVENTION

This application claims the priority of German Application No. 198 15 711.8, filed Apr. 8, 1998, the disclosure of which is expressly incorporated by reference herein.

The present invention relates to a method for controlling or automatically controlling the engine brake of a motor vehicle, and more particularly, to a method in which, in the coasting operation during a transmission shifting operation, the resulting braking torque acting upon the engine is reduced.

U.S. Pat. No. 5,088,348, shows an engine braking system for a motor vehicle which consists of a closable valve in the exhaust gas system of the internal-combustion engine and an associated valve in the intake system. In order to generate braking power in the coasting operation and brake the vehicle, the valve in the exhaust gas system can be closed by an electrically operable control element so that an excess pressure is built up in the exhaust gas system which counteracts the piston movement.

In the motor vehicle, an automatic transmission is used which automatically triggers a shifting change as soon as the vehicle speed falls below a defined value and the accelerator pedal is simultaneously not acted upon. During the shifting change, the transmission is uncoupled from the engine so that no external output torque can be transmitted to the engine by the transmission, and the engine is acted upon without any opposing output torque only by the braking power of the engine brake. In order to avoid the rotational engine speed of the internal-combustion engine from falling considerably as the result of the braking power and a back kick taking place onto the transmission, a control signal is generated in a control system. The control signal is supplied to the control element of the valve in the exhaust gas system whereupon the engine brake is rendered inoperative during a shifting change. As a result, a falling of the rotational engine speed is prevented by the engine brake so that both blades of the converter of the automatic transmission rotate approximately at the same rotational speed.

This known system has the disadvantage that, because of the inherently dynamic behavior of the components of the engine brake, a precise adjustment of the time period during which the engine brake is rendered inoperative cannot be sufficiently achieved. A premature or late disconnection or reconnection of the engine brake results either in an unnecessary loss of braking power or in an undesirably large drop of the rotational engine speed.

SUMMARY OF THE INVENTION

An object of the present invention is to be able to influence, at low expenditures, the torques in the engine braking operation of the vehicle which act upon the internal-combustion engine in a manner which is as precise as possible during a transmission shifting operation.

According to the invention, this object has been achieved by, providing that, during the shifting operation, the decisive cross-section in front of the turbine wheel of an exhaust gas turbocharger having a variable turbine geometry is expanded, braking valves at the cylinder outlet of the internal-combustion engine are closed, and, while using an automatic differential rotational speed control, the injected fuel amount is increased to such an extent that the rotational engine speed and the rotational transmission speed are synchronized.

The fuel quantity injected additionally into the combustion chamber generates an additional engine power which at least partially compensates the engine braking power so that a falling of the rotational engine speed during a shifting operation is largely avoided. The engine brake acting upon the internal-combustion engine is prevented at the point in time of the shifting operation, at which the transmission output shaft is uncoupled from the crankshaft. Therefore, no torque of the transmission opposes the braking torque acting upon the crankshaft to significantly reduce the rotational engine speed, which, when the shifting operation is terminated, would result in a high differential rotational speed with resulting problems when coupling the transmission. The additional engine power counteracts the engine braking power so that differential rotational speeds in the transmission line are essentially avoided or at least satisfactorily reduced. Drive torques and braking torques acting upon the internal-combustion engine are thus essentially compensated.

The method of the present invention can also be used in manual transmissions as well as automatic transmissions. In manual transmissions, the rotational speeds of the crankshaft and of the transmission drive shaft, and subsequently the rotational speeds of the two interacting clutch disks of the clutch, are synchronized. In automatic transmissions, the rotational speeds of the two blades of the torque converter are kept at approximately the same level.

The engine injection is expediently underlaid by an automatic differential rotational speed control which determines the additionally injected fuel quantity fully electronically as a function of the rotational speed difference between the engine and the transmission. The automatic differential rotational speed control can be used in the case of manual transmissions as well as in the case of automatic transmissions.

In a preferred further embodiment, the internal-combustion engine has an exhaust gas turbocharger with a variable turbine geometry for changing the turbine cross-section. The turbine geometry can be changed into a ram position in which the flow cross-section of the turbine or of the exhaust gas duct is reduced and a high exhaust gas counterpressure is built up in the line section between the cylinders and the exhaust gas turbocharger. According to the construction of the used exhaust gas turbocharger, the variable turbine geometry consists of rotary blades, of axially displaceable turbine stator guide blades or flap turbines which have several exhaust gas flows which lead to the turbine wheel and which can be shut off by flaps. The exhaust gas flows at a high speed through the ducts between the guide blades of the turbine and acts upon the turbine wheel, whereupon the compressor in the intake system builds up an excess pressure. As a result, the cylinder is acted upon on the input side by an increased charging pressure. An excess pressure exists on the output side between the cylinder outlet and the exhaust gas turbocharger, and counteracts the blowing-off of the air compressed in the cylinder by way of brake valves into the exhaust gas system. During the braking operation, the piston must carry out compression work in the compression stroke against the high excess pressure in the exhaust gas system, whereby a high braking effect is achieved.

During the shifting operation, the decisive cross-section in front of the turbine wheel is expanded by the adjustment of the turbine geometry and/or of a blow-off device with a blow-off valve. Thereby the excess pressure in the pipe section between the cylinder outlet and the turbine, as well as the engine braking power, are reduced. In combination with the additionally injected fuel quantity, by way of the reduction of the exhaust gas counterpressure, on one hand an active reduction of the braking torque affecting the engine is caused, and, on the other hand, by the additional engine power, an additional drive torque is generated.

The method according to the present invention can also be combined with an operation of braking valves at the cylinder outlet which are normally open in the engine braking operation during the compression phase and/or the expansion phase in order to permit a blowing-off of the compressed combustion chamber content into the exhaust gas system. The braking valves are closed during the shifting operation, whereby a blowing-off and connected flow losses are prevented. As the result of the closing of the braking valves, only the drag moment of the currently existing charging degree still acts upon the engine, connected with a clearly reduced braking torque onto the crankshaft.

BRIEF DESCRIPTION OF THE DRAWING

Other objects, advantages and novel features of the present invention will become apparent from the following detailed description of the invention when considered in conjunction with the accompanying drawing wherein the sole FIGURE is a schematic representation of an automatic control and control of an internal-combustion engine with a manual transmission and an exhaust gas turbocharger in accordance with the present invention.

DETAILED DESCRIPTION OF THE DRAWING

The internal-combustion engine 1 in a motor vehicle, for example, a diesel internal-combustion engine in a utility vehicle, has an exhaust gas turbocharger 3 which is equipped with a variable adjustable turbine geometry. If axial thrust or flap turbines are provided, a blow-off device 25 which has an automatically controllable valve is used. The exhaust gas turbocharger 3 consists of a compressor 10 arranged in the intake system 8 of the internal-combustion engine for generating an increased charging pressure at the cylinder inlet, and of a turbine 11 in the exhaust gas system 9 which is driven by the exhaust gas flow of the internal-combustion engine. The turbine 11 is provided with a variable turbine geometry and optionally with a blow-off device 25 for the variable adjustment of the flow cross-section. The variable turbine geometry may be implemented by rotary blades, by axially displaceable guide baffles or by other varioturbine types, for example, by several flow channels directed to the turbine wheels which can be shut off by way of flaps. The variable turbine geometry and/or the blow-off device 25 are adjusted to the desired flow cross-section an adjusting element 12.

The internal-combustion engine 1 is followed by a transmission 2 which is configured as a manual transmission and is connected by a clutch 13 with the crankshaft 16 of the internal-combustion engine. A first clutch disk 14 of the clutch 13 is non-rotatably connected with the crankshaft 16; a second clutch disk 15 is non-rotatably coupled to a transmission drive shaft 17 of the transmission 2. The drive torque generated in the engine operation is transmitted by the crankshaft 16 and the transmission drive shaft 17 to a transmission output shaft 18. In the engine braking operation, the braking torque of the engine 1 counteracts the transmission output torque at the transmission output shaft 18.

The vehicle is based on an automatic engine control and an engine control 4 for automatically controlling and controlling the driving and operating conditions of the internal-combustion engine 1, of the exhaust gas turbocharger 3 and optionally of the transmission 2. Several processing units 5, 6, 7 are assigned to the automatic engine control and the engine control 4. One processing unit, respectively, is assigned for the automatic control and control of injection nozzles 19; for braking valves 20 by way of which the cylinders of the internal-combustion engine, in addition to the outlet valves, communicate with the exhaust gas system 9; and for the control element 12 of the exhaust turbocharger 3.

As a function of input signals, which represent parameters or operating conditions of the vehicle, control signals are generated in the automatic engine control and engine control 4 with the processing units 5, 6, 7, which control signals are transmitted by way of signal lines 21, 23, 24 for acting upon the respective vehicle components and their pertaining control elements. The processing unit 5 of the automatic engine control and engine control 4 contains an automatic differential rotational speed control for a fuel injection automatically controlled as a function of the differential rotational speed between the engine and the transmission.

When the clutch pedal is operated, the clutch disks 14, 15 of the clutch 13 are separated. In the engine braking operation, the automatic engine control or engine control 4, by way of a signal line 23, which connects the transmission 2 with the automatic engine control or engine control 4, receives the information as an input signal that a shifting change was initiated, whereupon the automatic differential rotational speed control in the processing unit 5 is activated. Likewise, by way of the signal line 23 or additional signal lines (not shown), the rotational speeds of the crankshaft 16 and of the transmission drive shaft 17 of the automatic engine control or engine control 4 are supplied as input signals.

According to an underlying control law, and optionally as a function of other parameters and operating conditions, the processing unit 5 determines a control signal from the difference between the rotational speeds, which is supplied by way of the signal line 21 to the injection nozzles 19 and determines the quantity of the fuel to be injected during the gear change such that the rotational speeds of the crankshaft 16 and of the transmission drive shaft 17 are rapidly adapted. After the gear shift has been carried out, the clutch 13 is locked again.

The fuel injection during a gear change can take place in addition to a minimal fuel quantity injected also in the engine braking operation. However, it may also be expedient not to supply any fuel in the engine braking operation while the gear is engaged and to inject fuel for compensating the braking torque only during the shifting operation.

The rotational speed adaptation makes possible the achievement that, also at high engine braking powers when the engine is uncoupled from the transmission and a connected elimination of the transmission of the external transmission output torque onto the engine, the rotational crankshaft speed is held at the level of the rotational transmission speed or is brought to this level. Thereby, after the conclusion of the shifting change, a coupling can be carried out without any problem.

According to another embodiment, after the initiation of the shifting operation in the second processing unit 6, a control signal is generated which is supplied by way of the signal line 22 to control elements of the braking valves 20 and closes the braking valves. In the closed position of the braking valves 20, a blowing-off of the combustion chamber content into the exhaust gas system 9 is prevented, and the engine braking power is reduced. After the conclusion of the shifting operation, the braking valves 20 are closed again.

Decompression valves, which are formed separately from the outlet valves, can be used as braking valves by way of which the cylinders communicate with the exhaust gas system. However, the outlet valves themselves may expediently be used as the braking valves in that, deviating from the opening cycle of the charged operation, the outlet valves are continuously opened during the shifting process in the engine braking operation.

In the third processing unit 7, a control signal is generated which is used for expanding during the shifting operation the decisive flow cross-section in front of the turbine wheel so that the exhaust gas counterpressure is reduced. By way of the signal line 24, the control signal is supplied to the adjusting element 12 for adjusting the flow cross-section in the turbine 11 and/or to the blow-off device 25 of the exhaust gas turbocharger 3. Starting from the narrowest turbine cross-section, the variable turbine geometry of the exhaust gas turbocharger 3 is adjusted into an opening position with an expanded cross-section or the blow-off cross-section is opened up, whereupon the exhaust gas counterpressure and the charging pressure are reduced and the braking power decreases. After the conclusion of the shifting operation, the variable turbine geometry is set back into a position with a reduced turbine cross-section and the blow-off device is closed in order to permit a higher braking power.

The three methods, namely fuel injection, operation of the braking valves and opening of the turbine cross-section and/or of the blow-off device in the exhaust gas turbocharger, which can be used in the engine braking operation can be constructed independently of one another individually or in any combination. In particular, it is possible to combine two or all three methods. According to a preferred embodiment, the sequence in the shifting phase when all three methods are used is as follows.

In the engine braking operation, the clutch disks 14, 15 are separated when the clutch pedal is operated. Simultaneously with the separation of the clutch disks, the decisive cross-section in front of the turbine wheel 11 is expanded by adjusting the variable turbine geometry and/or the blow-off device 25 is opened up, for example, by opening the turbine stator guide blades or the blow-off cross-section, and the braking valves are closed simultaneously. In addition, by way of the automatically differential-rotational-speed-controlled fuel injection, a fast adaptation of the rotational engine speed takes place to the rotational speed of the transmission.

After the gear change has been carried out, the variable turbine geometry, and optionally the blow-off device 25 is/are closed again in an automatically controlled manner. The braking valves are opened up again in the crank angle phases provided for this purpose. After the locking of the clutch, additional fuel can first be continued to be injected in the engine braking operation so that, by way of the additionally generated engine power, the exhaust gas counterpressure and the charging pressure, by way of the exhaust gas turbocharger, are increased to such an extent that the desired braking power is reached.

The method according to the invention can be used in the engine braking operation also when using automatic transmissions. In this situation, the rotational speeds of the two blades of the torque converter are adapted by way of the fuel injection.

The adjustment and determination of the fuel injection, of the operation of the braking valves and of the expansion of the turbine cross-section or of the cross-section of the blow-off valve can take place by an automatic control and/or a control. The automatic differential rotational speed control of the present invention can be used for all three methods.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling or automatically controlling a motor vehicle engine, comprising the steps of performing a transmission shifting operation during coasting; reducing resulting braking torque upon an internal combustion engine; during the shifting operation expanding a decisive cross-section in front of a turbine wheel of an exhaust gas turbocharger having a variable turbine geometry, closing braking valves at the cylinder outlet of the internal-combustion engine, and while using automatic differential rotational speed control, increasing injected fuel amount to such an extent that rotational engine speed and rotational transmission speed are synchronized.

2. The method according to claim 1, wherein
   when a manual transmission is used, using the automatic differential rotational speed control for synchronization of rotational crankshaft speed to rotational speed of the transmission drive shaft.

3. The method according to claim 1, wherein
   when an automatic transmission is used, using the automatic differential rotational speed control for the synchronization of rotational speeds of two converter blades of the automatic transmission.

4. The method according to claim 1, wherein
   a blow-off cross-section of a blow-off device associated with the exhaust gas turbocharger is opened up during the shifting operation.

5. The method according to claim 2, wherein
   a blow-off cross-section of a blow-off device associated with the exhaust gas turbocharger is opened up during the shifting operation.

6. The method according to claim 3, wherein
   a blow-off cross-section of a blow-off device associated with the exhaust gas turbocharger is opened up during the shifting operation.

* * * * *